US 8,546,702 B2

(12) United States Patent
Prest et al.

(10) Patent No.: US 8,546,702 B2
(45) Date of Patent: *Oct. 1, 2013

(54) ULTRASONIC BONDING OF DISCRETE PLASTIC PARTS TO METAL

(75) Inventors: Christopher David Prest, San Francisco, CA (US); Douglas Weber, Arcadia, CA (US)

(73) Assignee: Apple Inc., Cupertino, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/244,162

(22) Filed: Sep. 23, 2011

(65) Prior Publication Data

US 2012/0063115 A1 Mar. 15, 2012

Related U.S. Application Data

(63) Continuation of application No. 12/341,618, filed on Dec. 22, 2008, now Pat. No. 8,049,120.

(60) Provisional application No. 61/101,283, filed on Sep. 30, 2008.

(51) Int. Cl.
*H05K 7/02* (2006.01)
*B29C 65/00* (2006.01)

(52) U.S. Cl.
USPC .................. 174/541; 156/73.1; 361/809

(58) Field of Classification Search
USPC ........ 174/535, 541; 361/807, 809; 156/73.1; 257/782, 783
See application file for complete search history.

(56) References Cited

U.S. PATENT DOCUMENTS

| | | | | |
|---|---|---|---|---|
| 5,288,350 A * | 2/1994 | Kita | ................ | 156/73.1 |
| 5,397,408 A * | 3/1995 | Guzik et al. | ............. | 156/73.1 |
| 5,411,116 A * | 5/1995 | Kish et al. | ............. | 184/6.12 |
| 5,520,775 A * | 5/1996 | Fischl et al. | ............. | 156/580.1 |
| 8,049,120 B2 * | 11/2011 | Prest et al. | ............. | 174/535 |
| 2002/0160145 A1 * | 10/2002 | Bauhoff | ............. | 428/99 |
| 2009/0017242 A1 | 1/2009 | Weber et al. | | |
| 2009/0190290 A1 | 7/2009 | Lynch et al. | | |
| 2009/0260871 A1 | 10/2009 | Weber | | |

OTHER PUBLICATIONS

"Part Design for Ultrasonic Welding," Branson, Technical Information PW-3, Applied Technologies Group, Feb. 2003.

* cited by examiner

*Primary Examiner* — Hung Ngo
(74) *Attorney, Agent, or Firm* — Womble Carlyle Sandridge & Rice LLP

(57) ABSTRACT

Electronic devices and other apparatuses that include plastic parts ultrasonically bonded to metal parts are disclosed. A first component or part includes a metallic surface region having a surface roughness with one or more surface irregularities. A second component or part formed from a plastic material that can include an energy director is attached to the metallic surface region via an ultrasonic bond, such that a portion of the plastic material is melted or otherwise formed into the surface irregularities to attach the two components or parts together. The parts can be housings, internal components or other items. The surface irregularities can be formed as a result of a chemical etching process, a machining process, or a combination thereof, and can result in the creation of undercuts or cavities in the metallic surface region.

11 Claims, 6 Drawing Sheets

ULTRASONIC BONDING OF DISCRETE PLASTIC PARTS TO METAL

CROSS REFERENCE TO RELATED APPLICATIONS

This application claims priority to co-pending and commonly owned U.S. patent application Ser. No. 12/341,618, filed Dec. 22, 2008, which in turn claims priority to U.S. Provisional Patent Application No. 61/101,283, filed Sep. 30, 2008, both of which are entitled "ULTRASONIC BONDING OF DISCRETE PLASTIC PARTS TO METAL," and both of which are incorporated herein by reference in their entirety and for all purposes.

TECHNICAL FIELD

The present invention relates generally to the attachment of parts made of different materials, and more particularly to the attachment of plastic and metal parts in the manufacture of electronic devices.

BACKGROUND

The proliferation of media players, cellular telephones and numerous other electronic devices has grown immensely in recent years. Many of the wide varieties of such devices have given rise to some interesting manufacturing developments. For example, many electronic devices have housings that are made from several different parts, as well as complex mechanical structures, features, and/or other internal parts that must also connect or attach to the housing. These different housing parts and internal parts that must attach to each other are often made from different materials, which can present various challenges in the manufacturing process.

One common mode of attachment is simply to use an adhesive to affix one part to another. The various drawbacks to using adhesives are well-known, and include, for example, relatively lesser limits on bonding strength, the tendency of some adhesives to gradually fail over time, and the possibility that some adhesives do not work well with bonding some materials. This last issue can be particularly problematic where parts made from entirely different materials are to be attached to each other, such as, for example, metal and plastic.

Alternatively, different parts can be welded or otherwise fused to each other as another mode of attachment. In the case of metal parts, however, the high heat associated with a traditional welding process can alter the shape, color and/or texture of the metal parts. Such high heat can also damage or affect other parts that may be in the vicinity of the weld. As such, many types of welds cannot be performed at later stages of an assembly process. Further, the complexity of features or other internal parts is limited to relatively simple components where the fusion welding of metal parts to each other is concerned.

Another common mode of attachment that can be used to attach plastic parts to each other involves ultrasonic welding. Ultrasonic welding of plastic materials is used extensively in many major industries, offers advantages in speed, efficiency and economy, and is often used where parts are too complex or expensive to be molded into a single piece. One big advantage of ultrasonic welding is that heating tends to be localized, such that the ultrasonic welding of plastic parts can take place at various stages of the overall manufacturing process without unduly disturbing nearby parts. Seams and joins of plastic parts that have been ultrasonically welded together can also be quite aesthetically pleasing in comparison with some traditional metallic welds. The ability to ultrasonically weld relatively complex plastic parts together cheaply and efficiently has resulted in the extensive use of plastics in the housings of many electronic devices. For example, various iPod® and iPhone® electronic devices made by Apple Inc. utilize housings having plastic parts that have been ultrasonically welded together.

Unfortunately, the ability to ultrasonically weld plastic parts together has traditionally limited the kinds of materials that can be used where such attachment techniques are to be used. While many thermoplastic parts can be fuse welded together at relatively low temperatures, other materials (e.g., metals) require much higher temperatures for fuse welding. In addition, fuse welding is typically limited to the joining of parts made from the same or similar materials. As such, any desire to substitute metal parts in for plastic parts in a design where welding is the mode of attachment has been traditionally impossible. This serves to limit the abilities of designers with respect to the materials that can be used in a particular design, such as for the housing and internal features or parts of an electronic device having complex internal features. In the event that such a change or adjustment is desired, then the mode of attachment typically must also change from an ultrasonic weld to an adhesive or other type of attachment that is suitable for attaching a plastic part to metal part. For example, where an internal plastic part is to be affixed to an inner surface of a metal housing, then an adhesive or other similar mode of attachment must typically be used.

While many designs and techniques for manufacturing electronic and personal devices have generally worked well in the past, there is always a desire to provide new and improved designs or techniques that can make it easier for a manufacturer or provider to combine parts made of different materials. In particular, the ability to attach plastic parts to metal parts with an approach that is quick, flexible and reliable is desired.

SUMMARY

It is an advantage of the present invention to provide for the ready and secure attachment of plastic items to metal items without requiring the use of an adhesive. This can be accomplished at least in part through the use of a metallic surface that is adapted to accept the flow of melted plastic into one or more surface irregularities therein, such that a plastic item can be ultrasonically bonded to a metal item having such a metallic surface.

In various embodiments of the present invention, an electronic device can include a first housing component adapted to hold or contain one or more internal electronic device components, and one or more electronic device parts formed from a plastic material and attached to the first housing component. At least a portion of the first housing component can be formed from metal. The metal portion can include a first metallic surface region having a surface roughness comprising one or more surface irregularities. The plastic part or parts can be attached to the first housing component via an ultrasonic bond, such that a portion of plastic material is formed into one or more of the surface irregularities.

Various embodiment details can include one or more of the following features, alone or in combination. The electronic device part(s) can further comprise secondary housing component(s) and/or internal electronic device component(s). Also, the electronic device part(s) can be initially formed to include one or more energy directors. The ultrasonic bond can involve the melting of plastic material from one or more electronic device parts, but preferably does not involve the melting of metal from the first housing component, or otherwise. Further, the first metallic surface region can comprise a surface texture that is different from the surface texture of a separate second metallic surface region located on the first housing component. In some embodiments, the first metallic surface region and second metallic surface region can be coplanar with respect to each other and be located on the same surface of the first housing component. Alternatively, the first metallic surface region and second metallic surface region can be located on separate surfaces of the first housing component. Further metallic surface regions are also possible.

In various embodiments, which can be combined with one or more of the foregoing detailed features, one or more surface irregularities can be formed on the first metallic surface region as a result of a chemical etching process. Alternatively, or in addition to the foregoing, one or more surface irregularities can be formed on the first metallic surface region as a result of a machining process. Such a machining process can result in the creation of undercuts or cavities in the first metallic surface region. The first metallic surface region can have a surface roughness (Ra) that is adapted to facilitate the bonding process with the melted and flowed plastic.

In further embodiments, a general apparatus can be provided that is similar to the foregoing electronic device, in that it can include a first component having at least a portion thereof formed from metal, and a second component formed from a plastic material. The metal portion can include a first metallic surface region having a surface roughness comprising one or more surface irregularities, and the second component can be attached to this first metallic surface region via an ultrasonic bond, such that a portion of the plastic material is formed into one or more of the surface irregularities to attach the second component to the first component.

While the first component can comprise a housing or housing part for the apparatus, other types of parts are also possible. As in the electronic device embodiment, the ultrasonic bond can involve the melting of plastic material, but preferably does not involve the melting of any metal. Also similar to the foregoing embodiments, the first metallic surface region can comprise a surface texture that is different from the surface texture of a separate second metallic surface region located elsewhere on the first component. Other details of any of the foregoing embodiments may also be similarly applied.

In still further embodiments, a method of attaching a plastic part to a metallic part is provided. Such a method of attaching can be used in the manufacture of an electronic device, among other possible applications. Various process steps can include selecting a plastic part and a metallic part to be used in the device, positioning the plastic part against and in contact with a first metallic surface region of the metallic part, providing ultrasonic energy (e.g., an ultrasonic weld or bond) to the plastic part, and permitting a melted portion of the plastic part to harden. The first metallic surface region can include a surface roughness comprising one or more surface irregularities, and when ultrasonic energy or bonding of the plastic part occurs, at least a portion of the plastic part at or near the first metallic surface region melts and forms into at least one of the one or more surface irregularities. Also, the plastic hardening step occurs while the melted plastic is inside at least one of the surface irregularities, thereby attaching the plastic part to the metallic part. An additional step can include treating the first metallic surface region via a chemical etching process, a machining process, or a combination thereof.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods that provide for the ultrasonic bonding of plastic parts to metal parts. These drawings in no way limit any changes in form and detail that may be made to the invention by one skilled in the art without departing from the spirit and scope of the invention.

DETAILED DESCRIPTION

Figure 1A:
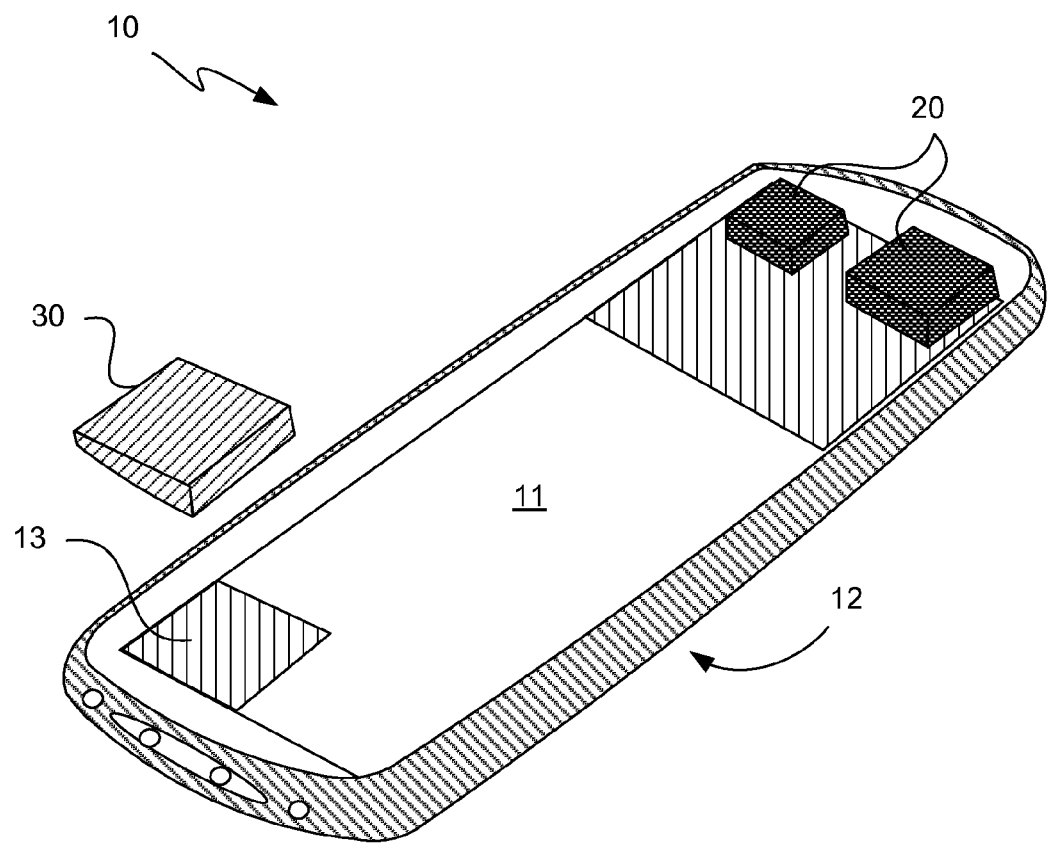
FIG. 1A illustrates in partially exploded top perspective view an exemplary metallic electronic device housing and a plastic internal component adapted to be attached to an inner surface of the electronic device housing.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to the implementation and use of ultrasonic bonding or welding to attach plastic parts to metal parts. Such attachments can be made as part of a device manufacturing process. The manufactured device can be, for example, an electronic device, such as an iPod® media player or iPhone® cellular telephone made by Apple Inc., or any other similar device. Although the various examples provided herein are illustrated and discussed with respect to a media device or other electronic device, it will be understood that the disclosed invention is not limited to such specific applications. Further, the plastic and metal parts can be completely or only partially metal or plastic, and either or both can be external housing components or internal device components. For example, the metal part can be part of an external housing, while the plastic part can be an internal device component that is ultrasonically welded to an interior surface of the metal housing. In addition, although the disclosed ultrasonic bonding process might be considered a "weld" in some regards, it is intended that any process involving the use of ultrasonic energy to melt plastic in order to create a bond with a metal can be used.

In various embodiments of the present invention, a metallic or partially metallic component having a specially treated metallic surface region is provided. The metallic surface region is treated specifically to facilitate the ultrasonic bonding of a plastic part thereto. The overall result is that various surface irregularities are formed on the metallic surface region in a manner that facilitates the melting and forming of the plastic part into the surface irregularities when ultrasonic energy is appropriately applied to the plastic part. In other embodiments, such an ultrasonic bond can form the plastic part into the metallic surface even where no special surface treatment on the metal surface exists.

The overall benefits of being able to bond plastic to metal are numerous. For one thing, the flexibility and variety available to device designers is huge where parts can be made out of either material, due to the ability to bond parts together regardless of whether they are plastic or metal. The ability to provide for hermetic seals due to the nature of the disclosed ultrasonic bonding or welding is also advantageous over adhesives and other modes of attaching parts in a device. The ability to bond to metal parts at late stages of an overall assembly or manufacturing process is also desirable in many instances. Additional environmental and other advantages can also be realized due to the ability to bond plastic parts to metal parts.

Referring first to FIG. 1A, a metallic electronic device housing and a plastic internal component adapted to be attached to an inner surface of the electronic device housing are illustrated in partially exploded top perspective view. Electronic device 10 can be, for example, an iPhone® cellular telephone made by Apple Inc., although many other types and brands of electronic devices could also serve as suitable examples for purposes of this disclosure, as will be readily appreciated. Electronic device 10 can include a metal housing component 11 having an outer surface 12, various internal parts 20, and a plastic internal component 30 that is to be attached to a specific inner surface region 13 of the metal housing component. Internal component 30 can be any of a wide variety of items or parts. By way of example, internal component 30 can be a speaker or volume control box having a plastic outer housing, among other possible items.

Figure 1B:
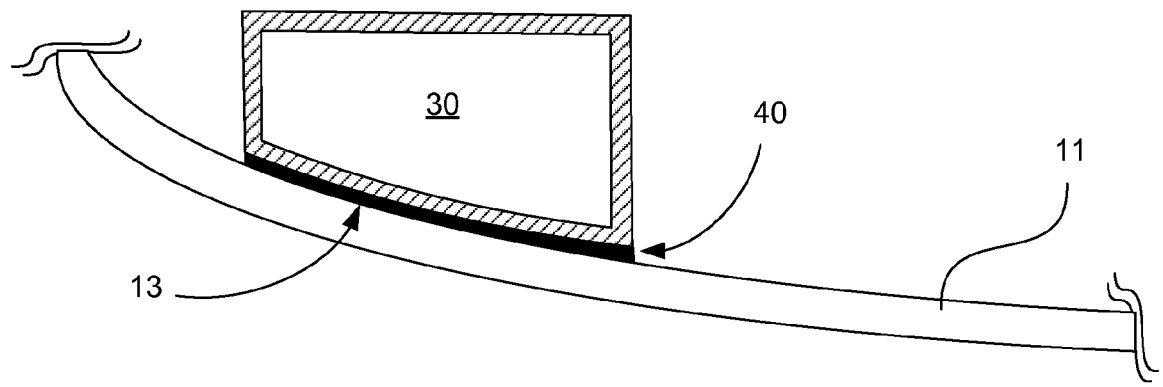
FIG. 1B illustrates in side cross-sectional view the exemplary metallic electronic device housing and plastic internal component of FIG. 1A, with the items being attached via an adhesive.

FIG. 1B illustrates in side cross-sectional view the exemplary metallic electronic device housing and plastic internal component of FIG. 1A, with these parts being attached by an adhesive. As shown, adhesive 40 is used to affix the bottom wall of plastic internal part 30 to surface 13 of the metal outer housing 11. Many different kinds of adhesives can be used, as well as various geometries and types of parts for such an attachment arrangement that is used to affix a plastic part to a metal part for an electronic device or any other kind of device. It will be understood that the particular geometries and items disclosed herein are provided only for purposes of illustration, and that all other variations involving the attachment of plastic parts to metal parts can be similarly adapted for ultrasonic bonding, as shown herein.

Figure 2:
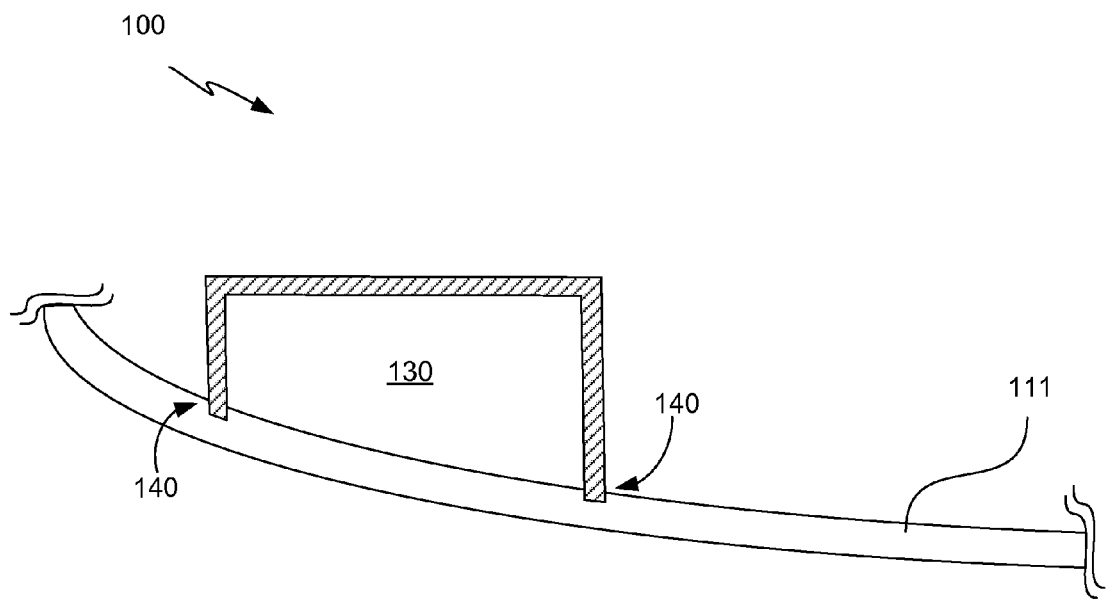
FIG. 2 illustrates in side cross-sectional view an exemplary electronic device housing and internal component attached thereto via an ultrasonic bond according to one embodiment of the present invention.

Turning next to FIG. 2, an exemplary electronic device housing and internal component attached thereto via an ultrasonic bond according to one embodiment of the present invention is shown in side cross-sectional view. As can be seen, electronic device 100 can be substantially similar to electronic device 10 from the foregoing example. Outer housing 111 can be formed from metal, while internal component 130 can be formed from plastic. Unlike the foregoing example, however, plastic internal component 130 has been ultrasonically bonded to metal housing 111 at a plurality of bond locations 140. Such bond locations can be at select points or "spot bonds," or can be along a continuous line or pattern, as may be desired. For example, a continuous bond line may be formed all along the contact between a bottom edge or perimeter of the plastic part and the metal housing. Such a continuous bond line may form a square, rectangle, or other shape, such that a hermetic seal is formed between the internal component and the housing as a result of the bond.

As shown, internal plastic component 130 does not have any bottom or lower wall. Such a bottom wall may or may not be present, as desired. However, the presence of such a bottom wall is not critical, since the large surface area typically needed to facilitate an adhesion attachment in not necessary. Rather, the edges of one or more side walls of plastic part 130 can be used to facilitate the ultrasonic bonding of the plastic part to the metal housing 111. Such ultrasonic bonds typically do not require as much surface area to facilitate the attachment of plastic parts, such that a lower or bottom wall is rendered as optional.

One property of any ultrasonic bond or bonds 140 is that ultrasonic energy directed thereto preferably results in the melting of plastic material, but not the melting of any metal material. As a result, the plastic preferably melts and forms into any surface irregularities that are present on the metallic surface against which the plastic part is placed. A mechanical interlock between the plastic and metal parts is then formed when the melted plastic material hardens while inside any such surface irregularities of the metal part. Although such a bond can be formed with respect to many different metal surfaces, due to the nature of metal parts to have microscopic surface irregularities, it may be preferable for the metal surface to be specially treated to receive such an ultrasonic bonding process, as set forth in greater detail below.

Figure 3:
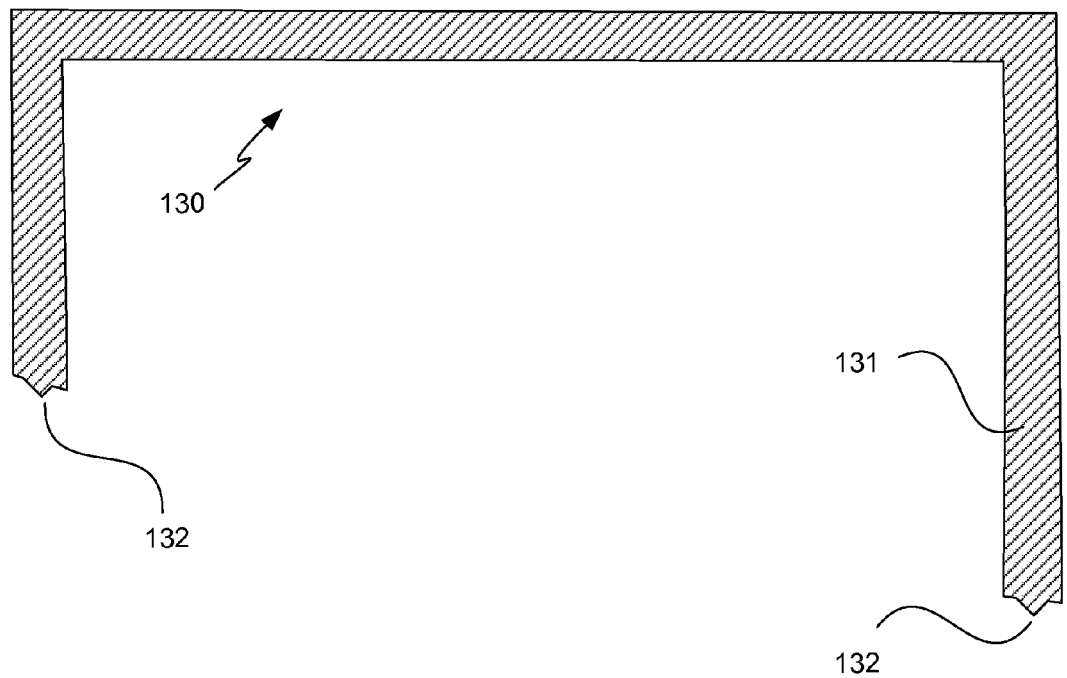
FIG. 3 illustrates in side cross-sectional view an exemplary plastic part having an energy director adapted for ultrasonic bonding according to one embodiment of the present invention.

Continuing now with FIG. 3, an exemplary plastic part having energy directors adapted for ultrasonic bonding or welding is shown in side cross-sectional view. As is generally known in the ultrasonic welding arts, it is preferable to have one or more energy directors to facilitate the ultrasonic welding of plastic parts. In general, plastic internal component 130 can have a plurality of walls 131, as well as a top and/or bottom wall. At one or more wall edges, one or more energy directors 132 can be integrally formed as part of the plastic housing. As noted above, such an energy director 132 can actually be a continuous ridge along the entire bottom wall edge of the plastic part 130, such that a continuous bond can be formed, such as in the shape of a rectangle. A bottom wall may or may not be present, and it will be readily appreciated that energy director 132 can simply be formed around the circumference of a bottom wall if such a wall exists on plastic part 130.

Figure 4A:
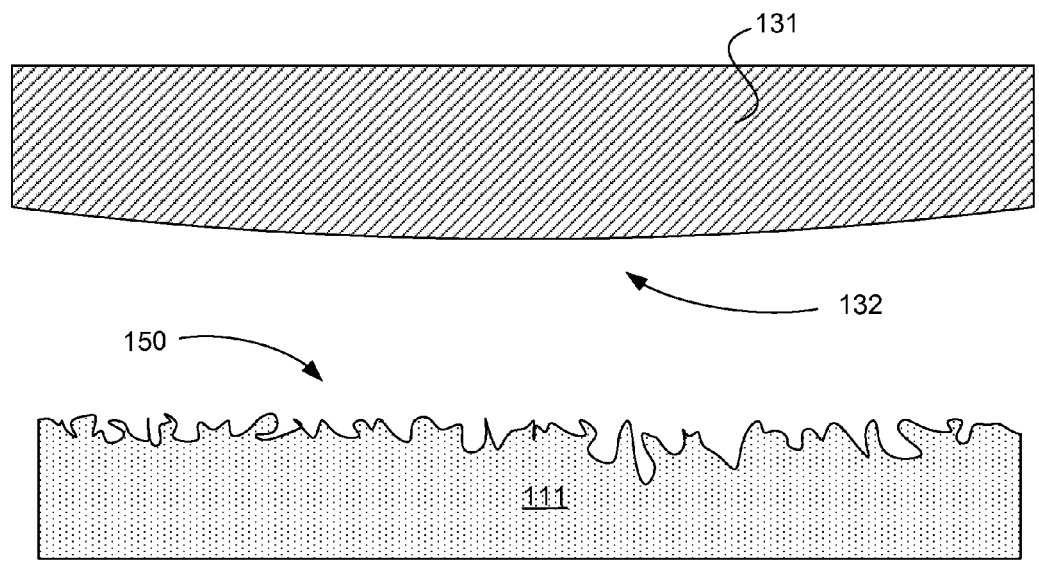
FIGS. 4A and 4B illustrate in side, cross-sectional and magnified views an exemplary metallic surface region and plastic part before and after ultrasonic bonding according to one embodiment of the present invention.
Figure 4B:
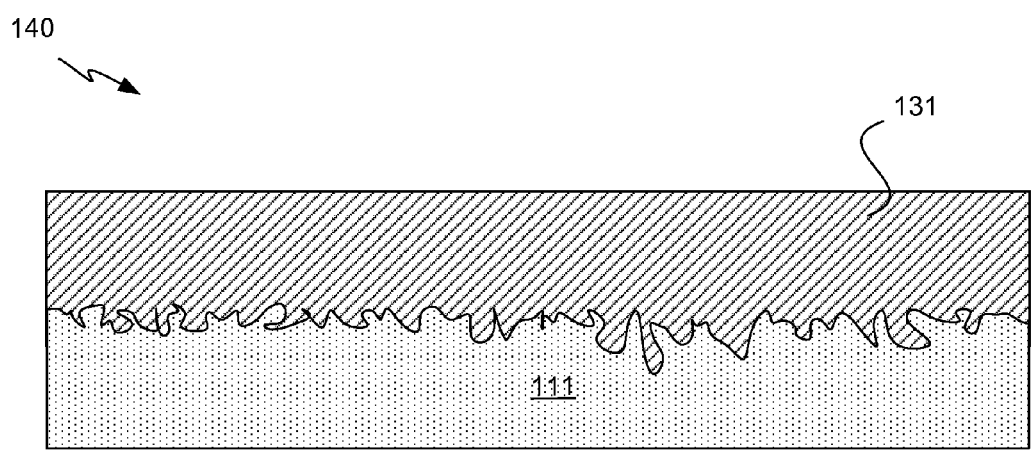

Moving next to FIGS. 4A and 4B, an exemplary metallic surface region and plastic part are illustrated in side, cross-sectional and magnified views both before and after ultrasonic bonding, according to one embodiments of the present invention. With respect to FIG. 4A, the energy director portion 132 of the wall 131 of the plastic part is placed just above an exposed surface 150 of metal housing 111. Due to the highly magnified nature of the illustration, only a close-up portion of the plastic is visible, and all that is visible is actually a part of energy director 132. The surface 150 of metal housing 111 has numerous surface irregularities, which are usually inherent in any metal part under the appropriate magnification. As shown, the surface irregularities on metal surface 150 are intended to represent those that might be found on an ordinary metal surface. The surface roughness can be at any suitable level, although a more polished surface can tend to have smaller surface irregularities, and thus less ability for stronger mechanical interlocking with formed plastic.

FIG. 4B illustrates ultrasonic bond 140 after the energy director 132 has been placed into contact with the metal surface and ultrasonic energy has been directed thereto to melt and form the plastic into the metal. As shown, plastic wall 131 has been melted and formed into the surface irregularities on the contacting surface of metal housing 111. After hardening inside these surface irregularities, the plastic has essentially reformed to integrate into and with the surface of the metal part, such that the overall plastic and metal parts are now attached via an ultrasonic bond. Again, preferably no portion of metal melts, due to the high temperatures that would be required. Rather, at least a portion of the plastic part melts and then conforms to the surface irregularities of the metal surface against which it is contacted. In some embodiments, a suitable amount of pressure should be directed against the metal part to aid in pushing the melted plastic into the various surface irregularities of the metal.

As may be appreciated, the level of mechanical interlocking for an ultrasonic bond with an ordinary metal surface may not always be ideal. In particular, very smooth or polished metal surfaces may have little to no surface irregularities that are even large enough for much plastic to permeate. Further, such irregularities can often be unhelpful to help form a mechanical interlock, particularly where they are mere dimples or depressions, and not true scraggly cavities, as shown in FIG. 4A. As such, it may be preferable for the surface finish or roughness of the designated metal surface to be relatively rough.

Ultimately, however, it is thought that ordinary metallic surfaces may not provide the best opportunities for the ultrasonic bonding and mechanical interlocking of plastic parts to metal parts. As such, one or more designated metal surfaces can be treated to help facilitate the mechanical interlocking that results from such bonds. By specially treating the metal surface or surfaces to which ultrasonic bonding will take place, a stronger mechanical interlocking and bond with the plastic part or parts to be attached can be realized. Such surface treatments can come in a variety of forms, such as, for example, chemical etching and/or machining processes.

Figure 5A:
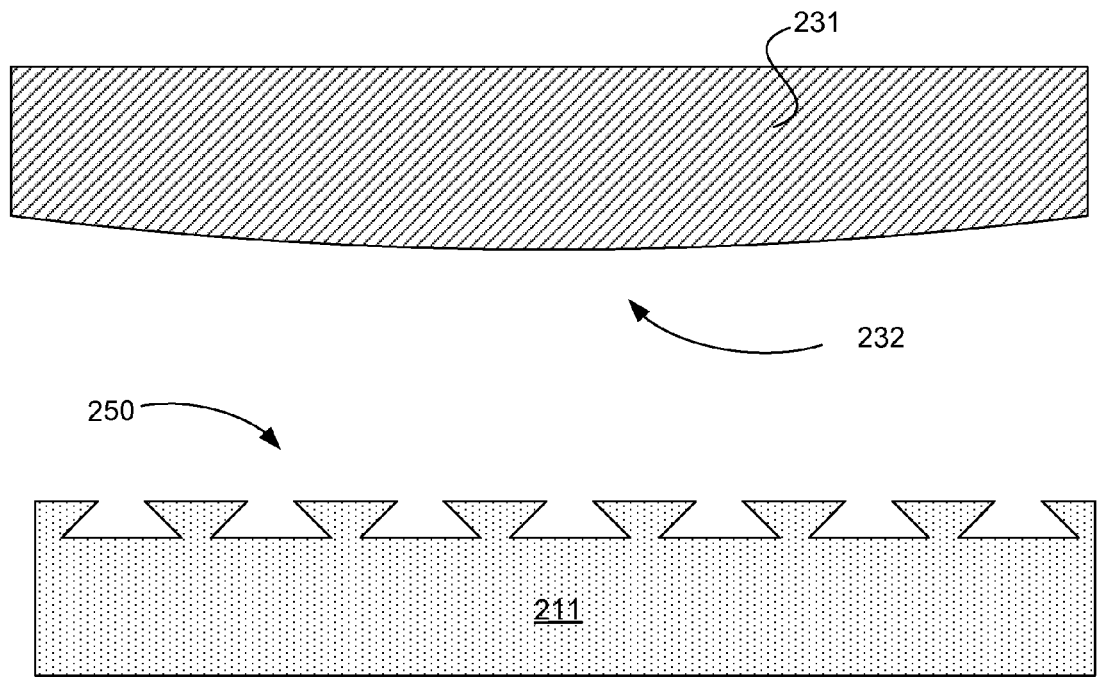
FIGS. 5A and 5B illustrate in side, cross-sectional and magnified views an exemplary alternative metallic surface region and plastic part before and after ultrasonic bonding according to an alternative embodiment of the present invention.
Figure 5B:
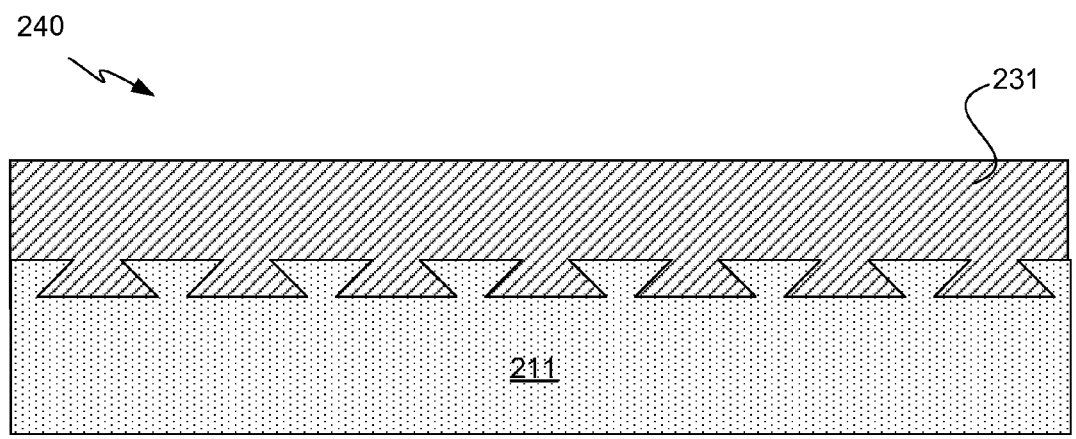

Turning to FIGS. 5A and 5B, an exemplary alternative metallic surface region and plastic part before and after ultrasonic bonding according to an alternative embodiment of the present invention are similarly shown in side, cross-sectional and magnified views. Plastic part wall 231 and energy director 232 can be identical or substantially similar to that which is shown in the foregoing example. Metal housing 211 can also be substantially similar to that shown in the foregoing example, with the notable exception of the surface finish of metallic surface region 250. Although natural surface irregularities (not shown) may still exist in the metal surface, the designated metal surface region 250 has been machined specifically to include a significant amount of undercuts and cavities to facilitate mechanical interlocking when plastic material is melted, flowed and hardened therein.

As shown in FIG. 5B, the resulting ultrasonic bond 240 then affixes the plastic wall 231 of the plastic part to and into the surface of metal housing 211. Because the surface of the metal has been specifically treated to include undercuts and cavities, the overall bonding strength of the ultrasonic well can be enhanced greatly over what is possible without such a specially treated surface. Of course, such a surface treatment can be applied to the entire metal part, to just one face or side of the metal part, or even just locally to the surface region or regions that will be used to facilitate ultrasonic bonding with plastic parts.

Further, the exact type of surface treatment is not critical. Rather, it is simply enough to treat the metallic surface such that it is more susceptible to forming stronger bonds via ultrasonic bonding. Although a mechanical machining example has been provided for purposes of illustration, any number of surface treatment techniques can be used, either alone or in combination. As another example, a solvent can be used to chemically etch the metallic surface, so as to create a textured surface that can more readily mechanically bond with melted and reformed plastic. In addition, microdrilling and/or laser cutting or pocking the metallic surface might also be used. Other suitable ways of treating the metallic surface are also contemplated.

Figure 6:
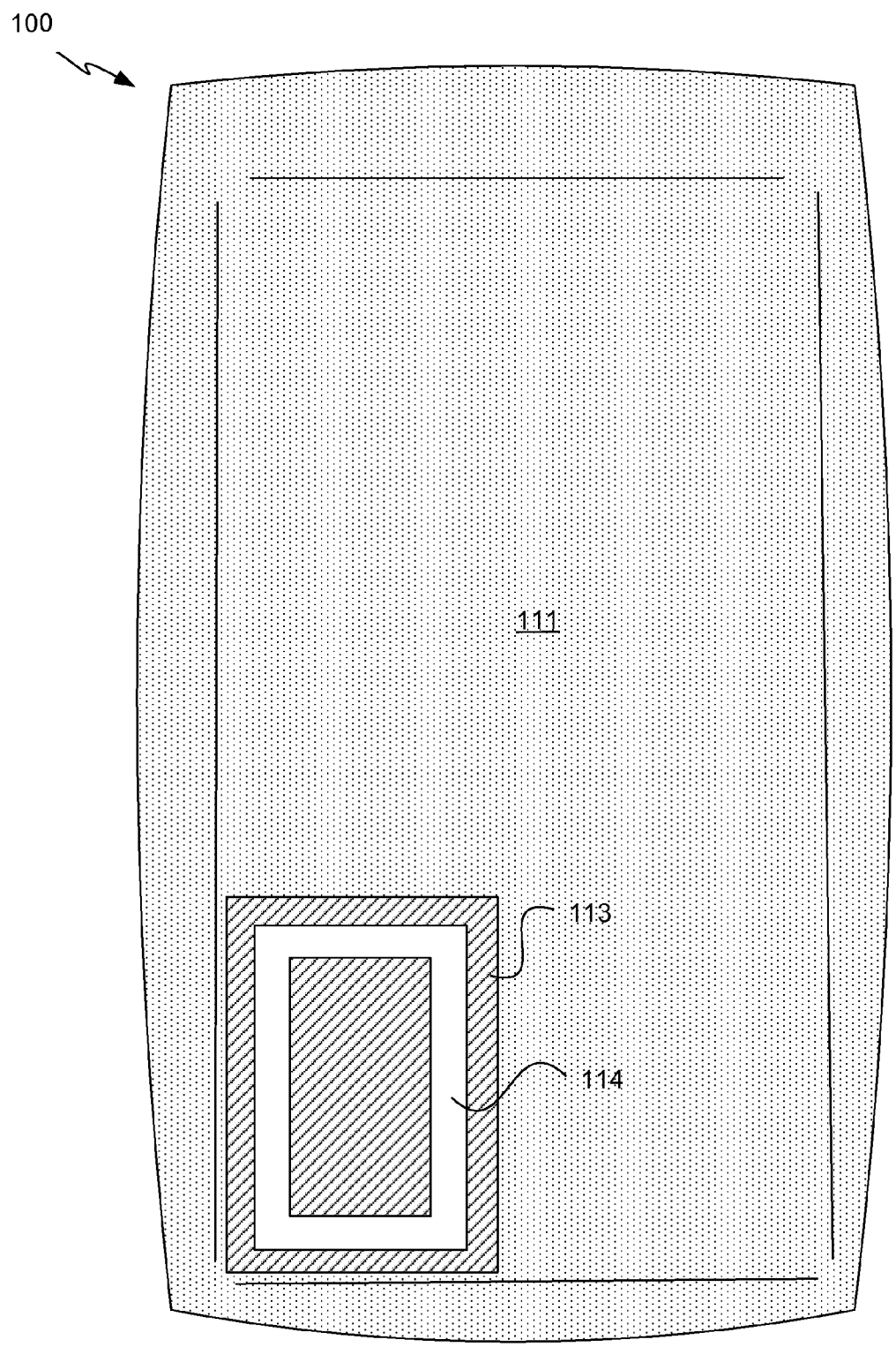
FIG. 6 illustrates in top plan view an exemplary metallic electronic device housing having treated metallic surface regions and non-treated metallic surface regions according to one embodiment of the present invention.

FIG. 6 illustrates in top plan view an exemplary metallic electronic device housing having treated metallic surface regions and non-treated metallic surface regions according to one embodiment of the present invention. As noted above, it is entirely possible to treat only the portion or portions of the metallic surface that need such treatment to facilitate ultrasonic bonding. In some instances, such as in the case of a chemical etching, it may be easier just to treat the entire metal part. In other instances, such as in the case of microdrilling or laser cutting or texturing, it may be more efficient to limit such surface treatments to those areas that require it.

As shown, electronic device 100 includes a metal housing component 111 having various surface areas and regions. Surface area 113 one such area that is designed for ultrasonic bonding to attach a plastic part thereto. Within surface area 113 is a first surface region 114 that is specifically treated to facilitate an ultrasonic bond. Again, such surface treatment can be chemical etching, microdrilling, laser cutting or texturing, or any other suitable machining or other surface treatment process. Treated surface region 114 is preferably shaped or designed to mate or match with a similarly sized and/or shaped energy director on a plastic part that is to be bonded thereto. In some embodiments, such as that which is shown in FIG. 6, treated and untreated surface regions may lie on the same side or "plane" of the metal surface. In other embodiments, an entire surface or part may be treated.

Although the illustrated shape is a rectangle, the bond of which can form a hermetic seal with a similarly shaped energy director on a plastic part, it will be readily appreciated that any other shape or size can also be used. In fact, a continuous bond or shape is not necessary. For example, it may be desirable in some instances only to treat the four corners of the rectangle, rather than the entire rectangle. The mating plastic part may then have a continuous rectangular energy director, or may alternatively have four energy director points to match the treated regions on the metallic surface. Many other alternative designs and arrangements are also possible, and all such alternatives are contemplated for use with the present invention. Again, although the example of an electronic device is shown, it is specifically contemplated that the ability to ultrasonically bond plastic to metal as disclosed herein can be applied to numerous other types of devices and contexts.

Figure 7:
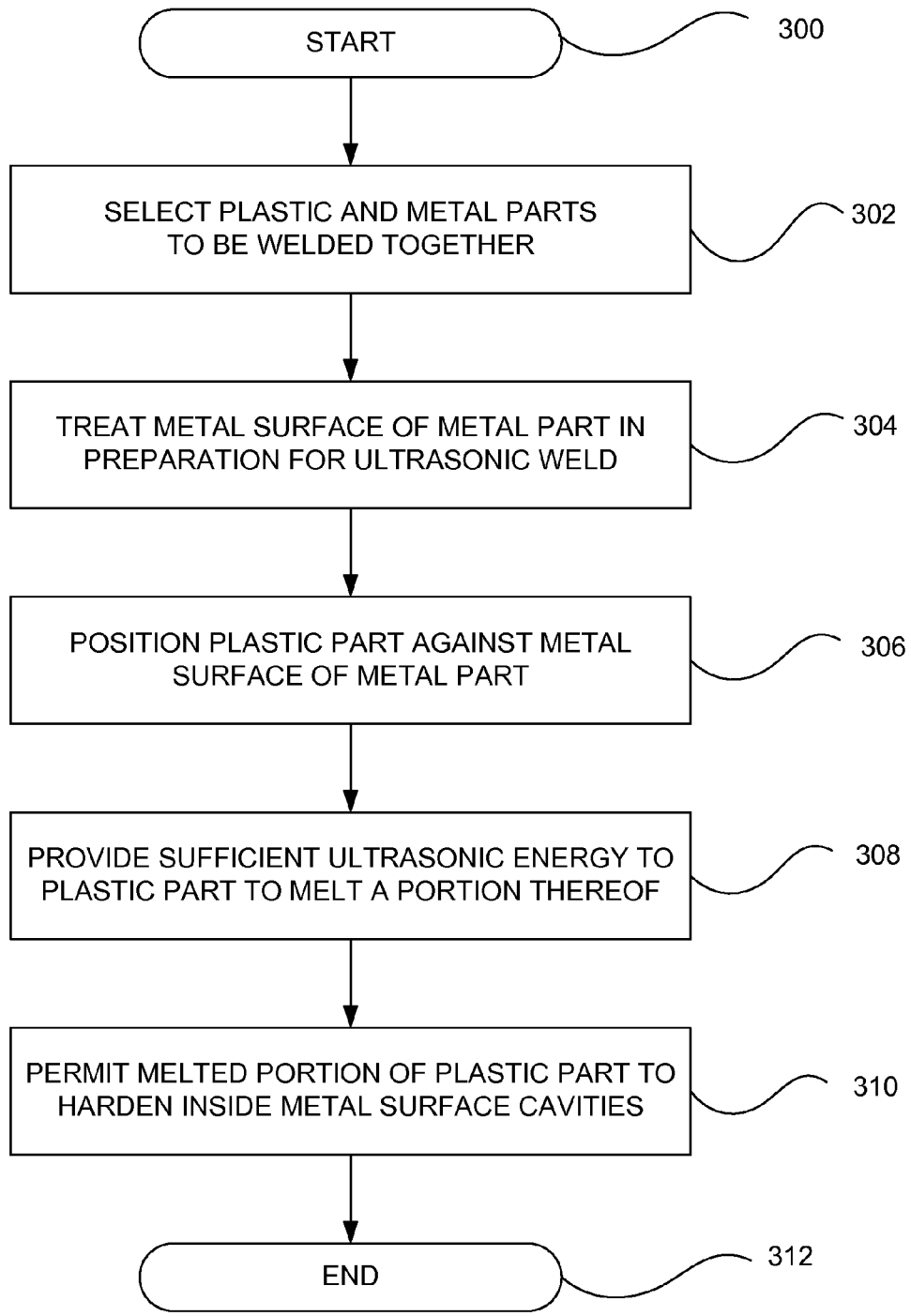
FIG. 7 illustrates a flowchart of an exemplary method of attaching a plastic part to a metallic part in the manufacture of an electronic device according to one embodiment of the present invention.

Moving lastly to FIG. 7, a flowchart of an exemplary method of attaching a plastic part to a metallic part in the manufacture of an electronic device is provided. It will be understood that the provided steps are shown only for purposes of illustration, and that many other steps may be included in the process, as may be desired. Furthermore, the order of steps may be changed where appropriate and not all steps need be performed in various instances.

After a start step 300, plastic and metal parts to be ultrasonically bonded together are selected at process step 302. After the parts are selected, one or more metal surfaces of the metal part may be treated at process step 304. Again, such surface treatment may not be necessary in some cases. After such a surface treatment step, if any, the method continues to process step 306, where the plastic part to be bonded is positioned against a metallic surface of the metal part. Subsequently, a sufficient amount of ultrasonic energy is provided to the plastic part at process step 308, such that a portion of the plastic part is melted up against the metallic surface and flows into one or more surface irregularities (i.e., cavities) therein. The melted portion of the plastic part is then permitted to harden inside the metal surface cavities at process step 310, after which the ultrasonic bond is complete, and the process ends at end stop 312.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. An electronic device, comprising:
    a housing component having at least a portion thereof formed from metal, wherein said metal portion includes a pattern of undercuts and cavities formed into a surface of the metal portion; and
    an electronic device part formed from a plastic material, wherein said electronic device part is attached to said metal portion of said housing component via an ultrasonic bond such that a portion of the plastic material is formed into said pattern of undercuts and cavities to attach said electronic device part to said housing component.

2. The electronic device of claim 1, wherein the pattern of undercuts and cavities occupy an area substantially the same as a surface of the electronic device part that is bonded to the housing component.

3. The electronic device of claim 1, wherein said electronic device part comprises a second housing component.

4. The electronic device of claim 1, wherein said electronic device part comprises an internal electronic device component.

5. The electronic device of claim 1, wherein said electronic device part is initially formed to include an energy director.

6. The electronic device of claim 1, wherein said ultrasonic bond involves the melting of said plastic material but does not involve the melting of said metal.

7. The electronic device of claim 1, wherein said pattern of undercuts and cavities are formed as a result of a chemical etching process.

8. The electronic device of claim 1, wherein said pattern of undercuts and cavities are formed as a result of a machining process.

9. A method of attaching components together, comprising:
    machining a pattern of undercuts and cavities into a surface of a metal portion of a housing component;
    placing a plastic portion of an electronic device part into contact with the metal portion of the housing component; and
    ultrasonically bonding the plastic portion to the metal portion in a manner such that a portion of the plastic material is formed into the pattern of undercuts and cavities of the metal portion, wherein said plastic material and said pattern of undercuts and cavities cooperate to attach the housing component to the electronic device part.

10. The method of claim 9, further including the step of:
    permitting said melted plastic to harden while inside said pattern of undercuts and cavities, thereby attaching said plastic portion to said metal portion.

11. The method of claim 9, wherein said housing component and electronic device part are part of an electronic device.

* * * * *